United States Patent [19]

Saur et al.

[11] Patent Number: 5,419,488
[45] Date of Patent: May 30, 1995

[54] THERMOSTATIC VALVE

[75] Inventors: Roland Saur, Stuttgart; Manfred Kurz, Ditzingen, both of Germany

[73] Assignee: Behr-Thomson-Dehnstoffregler GmbH & Co., Kornwestheim, Germany

[21] Appl. No.: 284,117

[22] Filed: Aug. 2, 1994

[30] Foreign Application Priority Data

Aug. 3, 1993 [DE] Germany .......................... 45 25 975.8

[51] Int. Cl.[6] ................................................. F01P 7/16
[52] U.S. Cl. ..................................... 236/34.5; 236/100
[58] Field of Search .................... 236/34, 34.5, 100, 12, 236/22

[56] References Cited

U.S. PATENT DOCUMENTS

| | | | |
|---|---|---|---|
| 3,510,060 | 5/1970 | Starmuhler | 236/34.5 |
| 3,817,450 | 6/1974 | Mischke | 236/34.5 |
| 4,269,350 | 5/1981 | Beck | 236/34.5 |
| 4,288,031 | 9/1981 | Hass | 236/34.5 |
| 4,456,167 | 6/1984 | Buter | 236/34.5 |
| 4,883,225 | 11/1989 | Kitchens | 236/34.5 |
| 5,129,577 | 7/1992 | Kuze | 236/34.5 |
| 5,275,231 | 1/1994 | Kuze | 236/34.5 X |

FOREIGN PATENT DOCUMENTS 1295255  5/1969  Germany .

*Primary Examiner*—William E. Tapolcai
*Attorney, Agent, or Firm*—Evenson, McKeown, Edwards & Lenahan

[57] ABSTRACT

In the case of a thermostatic valve for a cooling system of an internal-combustion engine comprising a thermostatic working element, it is provided that the housing of the working element is held in a stationary manner, in that the working piston is provided with the main valve disk which surrounds the housing of the working element in a pot-type manner and is provided with openings in the area of its side walls, and with the short-circuit valve disk, and in that on the side of the main valve disk facing away from the working piston, the housing of the working element is situated to be at least partially free in the coolant flowing in from the radiator.

8 Claims, 2 Drawing Sheets

THERMOSTATIC VALVE

BACKGROUND AND SUMMARY OF THE INVENTION present invention relates to a thermostatic valve for a cooling system of an internal-combustion engine comprising a thermostatic working element which has a housing containing an expansion material which drives a working piston out of the housing as a function of the temperature and therefore, as a function of the temperature of a coolant, sets the positions of a main valve disk and of a short-circuit valve disk which bound a mixing chamber for coolant which flows in from a radiator through a main valve and for coolant which flows in directly from the internal-combustion engine through a short-circuit valve and is then returned to the internal-combustion engine.

In a thermostatic valve of the above described type shown German Patent Document DE-AS 12 95 255, the working piston of the thermostatic working element is supported in a stationary manner. The housing of this working element carries a main valve disk and a short-circuit valve disk. The housing of the thermostatic working element, which is the temperature sensing element, is situated completely in the mixing chamber which is bounded essentially by the main valve disk and the short-circuit valve disk. When the cold internal-combustion engine is started, this temperature sensing element is acted upon by the heating-up short-circuit flow of the cooling liquid so that the temperature sensing element opens up when this short-circuit flow has reached a defined temperature which is indicated by the selection of the expansion material (wax mixture).

It is an object of the invention to improve the control action of a thermostatic valve of the initially described type particularly during the starting of the cold internal-combustion engine of a motor vehicle.

This and other objects are achieved by the present invention which provides that the housing of the working element is held in a stationary manner, and that the working piston is equipped with the main valve disk. This main valve disk surrounds the housing of the working element in the manner of a pot and is provided with openings in the area of its side walls, and with the short-circuit valve disk. The main valve disk is guided, at least in the area of its closing position, in a sealing manner on the housing of the thermostatic working element or a holder of this housing. On the side of the main valve disk facing away from the working piston, the housing of the working element is disposed at least partially free in the coolant flowing in from the radiator.

With the present invention, the influence of very low outside temperatures and resulting correspondingly low radiator return flow temperatures is taken into account to an increased extent, particularly during the start of the internal-combustion engine. Since the temperature sensing element, specifically the housing of the thermostatic working element, is partially disposed in the cold coolant, a mixing temperature is obtained in the housing which is surrounded by the heating-up short-circuit flow so that the opening-up of the thermostatic valve is delayed at very low outside temperatures. As a result, it is achieved that a higher operating temperature is adjusted. Since the housing of the thermostatic working element is held in a stationary manner and does not move with the main valve disk into the area of the mixing chamber, the influence of very low outside temperatures and therefore of correspondingly low temperatures in the radiator return flow is taken into account to a greater extent also during the operating condition. A higher temperature level for the operating temperature is therefore set in the partial load range when the outside temperatures are low. In this manner, it is achieved that the thermostatic valve is automatically adjusted to a summer or winter operation. In the winter and at low outside temperatures, a higher temperature level is set in the partial load operation so that the comfort for the vehicle heater is also increased which is provided with a higher heating temperature.

Other objects, advantages and novel features of the present invention will become apparent from the following detailed description of the invention when considered in conjunction with the accompanying drawings.

DETAILED DESCRIPTION OF THE DRAWINGS

Figure 1:
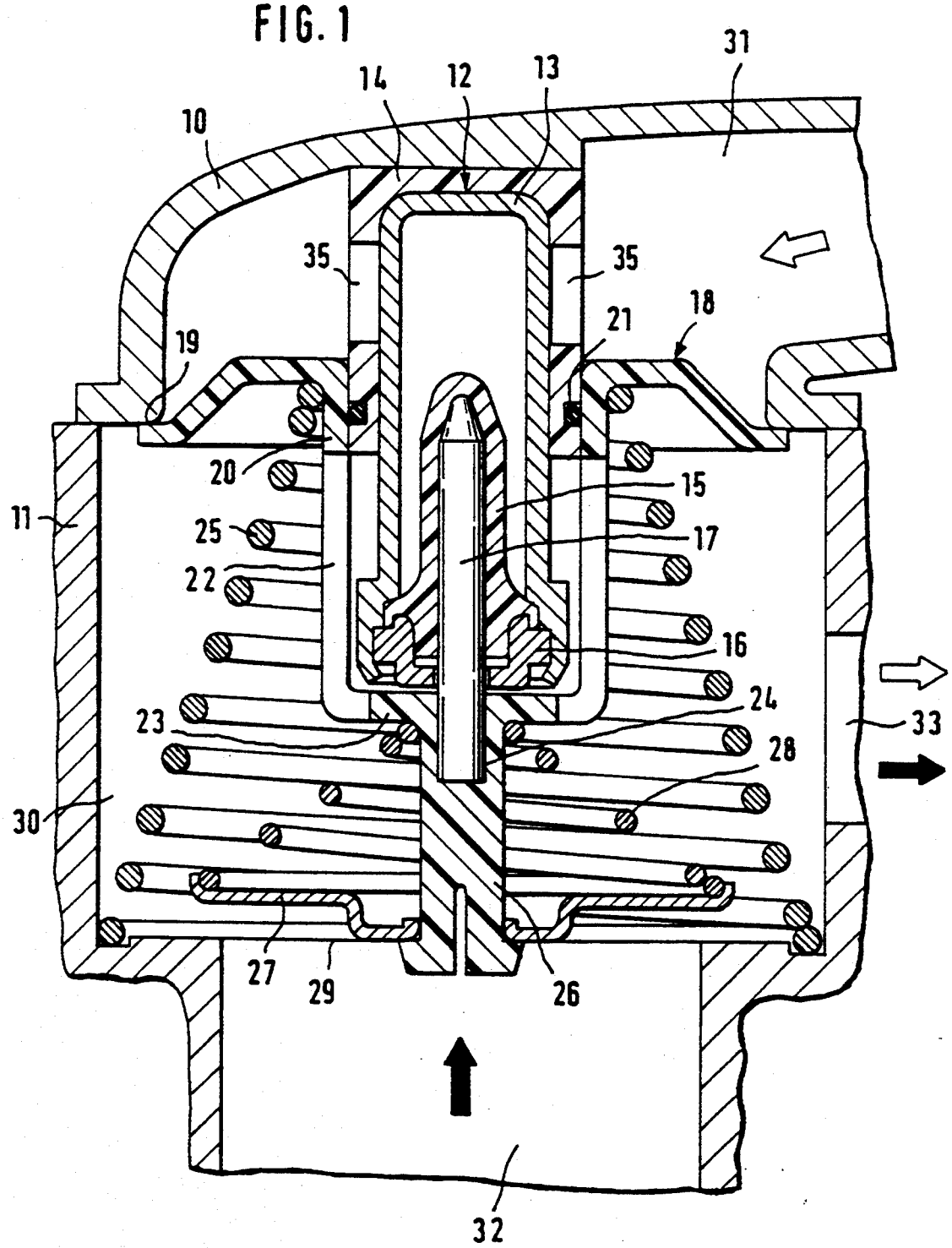
FIG. 1 is an axial sectional view of a thermostatic valve constructed according to an embodiment of the present invention.

The thermostatic valve illustrated in FIG. 1 comprises a valve housing formed of two parts 10, 11. A thermostatic working element 12 is arranged in the valve housing. The thermostatic working element 12 has a housing 13 made of a highly conductive metal, such as brass. This housing 13 is arranged in a stationary manner and is held on part 10 of the valve housing by means of a holder 14 made, for example, of a plastic material. An expansion material, for exampe a wax mixture, is housed in the housing 13 which is sealed off toward the outside by a bag-type membrane 15. The bag-type membrane 15 is held on the open housing edge by a guide part 16 which is held on the housing 13 by a flanged edge.

A working piston 17 is fitted into the bag-type membrane 15 and is guided by the guide part 16. When the volume of the expansion material is enlarged as a result of the temperature, the working piston 17 is driven out of the housing 13.

The working piston 17 is connected with a main valve disk 18 which has a design which is essentially pot-shaped in its cross-section. A valve seat 19 of part 10 of the valve housing is assigned to the main valve disk 18. The main valve disk 18 is provided with a closed collar 20 which is guided in the moving-out direction of the working piston 17 on the holder 14 of the housing 13 of the thermostatic working element. A sealing ring 21 is placed in a ring groove of the holder 14, which sealing ring 21 provides a securing sealing between the holder 14 and the main valve disk 18. In the area adjoining the collar 20, the main valve disk 18 is provided with openings so that essentially only webs 22 remain which connect the collar 20 with the bottom 23. The bottom 23 is provided with a recess 24 into which the outer end of the working piston 17 is fitted. The main valve disk 18 is loaded by a closing spring 25 which is supported on part 11 of the valve housing.

As an axial extension of the working piston 17, the main valve disk 18 is provided with a guiding pin 26 on which a short-circuit valve disk 27 is guided in a sliding manner. The short-circuit valve disk 27 is loaded by a short-circuit spring 28 which is supported on the bottom of the main valve disk 18. A short-circuit opening 29 of part 11 of the valve housing is assigned to the short-circuit valve disk 27. The area between the main valve disk 18 and the short-circuit valve disk 27 forms a mixing chamber 30 to which, during the normal operation, cold coolant is fed via a radiator return flow 31 and hot coolant is fed via an engine return flow 32. From the mixing chamber 30, the coolant flows via an engine forward flow 33 to the internal-combustion engine. The short-circuit valve, which is formed by the short-circuit valve disk 27 and the short-circuit opening 29, determines the proportions of the coolant of the engine return flow 32 which reach the mixing chamber 30.

The main valve comprising the main valve disk 18 and the valve seat 19 controls the valve cross-section by means of which the radiator return flow 31 to the mixing chamber 30 is opened up. The holder 14 for the housing 13 of the thermostatic working element is provided with openings 35 so that the housing 13 is disposed in the radiator return flow 31 at least in a partially free manner.

When the cold internal-combustion engine of a motor vehicle is started, the thermostatic valve is in the condition illustrated in FIG. 1; i.e., the main valve 18, 19 blocks the radiator return flow, while the short-circuit valve 27, 29 opens up the connection from the engine return flow 32 to the engine forward flow 33. In this condition, the heating-up coolant is therefore guided directly from the engine return flow 32 to the engine forward flow 33. The heating-up coolant of this short-circuit flow flows around the housing 13 of the thermostatic working element which is situated in the mixing chamber 30 because it is accessible to this flow through the openings of the side walls of the valve disk 18. The heating-up short-circuit flow heats the housing 13 of the thermostatic working element 12 and therefore also the expansion material contained in it. When the expansion material has reached the temperature predetermined by its wax mixture, it changes its state from firm to liquid, in which case then, when the temperature is increased more, the working piston 17 is driven out in an essentially linear manner. As soon as the working piston 17 moves out, the main valve 18, 19 starts to open up, while the short-circuit valve 27, 29 closes correspondingly; i.e., reduces the cross-section for the short-circuit flow. Then, cooled coolant flows from the radiator return flow 31 and uncooled coolant flows from the engine return flow 32 into the mixing chamber 30 and from there into the engine forward flow 33. In this case, the thermostatic valve sets a preselectable temperature as constantly as possible at which the coolant flows into the engine forward flow 33. When the temperature in the mixing chamber 30 continues to rise, the short-circuit valve 27, 28 is finally closed, while the main valve 18, 19 is opened up more. The thermostatic valve has then switched over to a pure cooling operating mode; i.e., there is no mixing in the mixing chamber 30 because then only cooled coolant is fed to the mixing chamber 30.

In the thermostatic valve according to the present invention, the temperature sensing element, specifically the housing 13 of the thermostatic working element 12, is subjected not only to the coolant flow in the mixing chamber 30 but directly also to the cooled coolant in the radiator return flow 31. For this purpose, it is provided that the housing 13 of the thermostatic working element 12 projects into this radiator return flow 31 and is accessible there to this cooled coolant because its holder 14 is provided with openings 35 which expose the housing 13 for this coolant of the radiator return pipe. As a result, it is achieved that the temperature of the coolant in the radiator return flow 31 is included more than previously in the control action, particularly when outside temperatures are very low.

Figure 2:
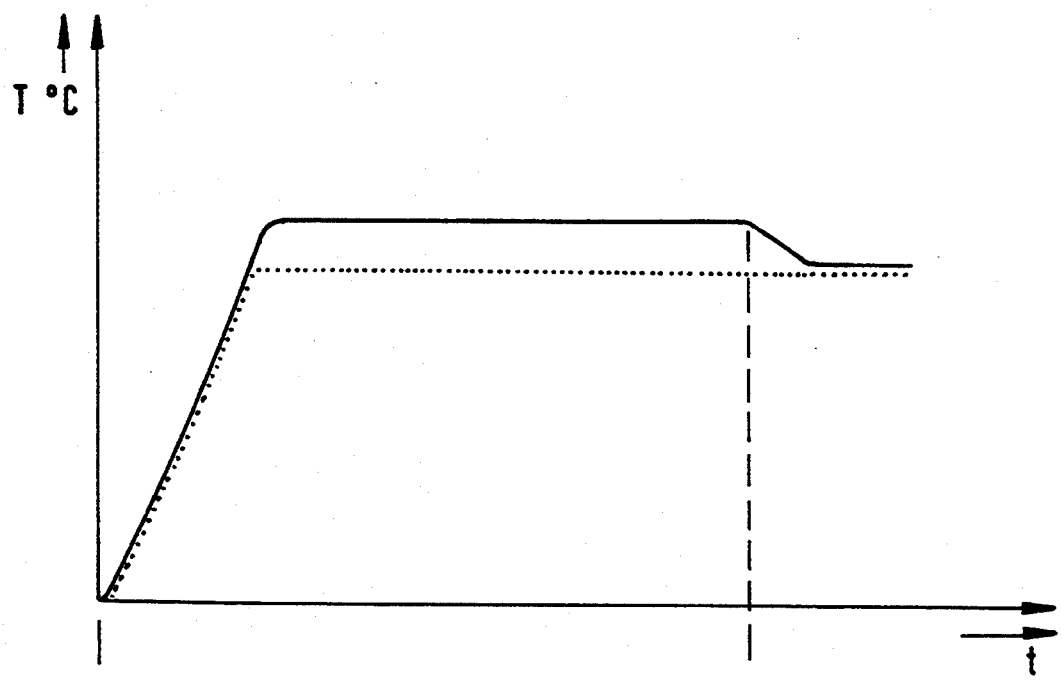
FIG. 2 shows the course of the operating temperature (temperature in the engine forward flow) which can be achieved by the thermostatic valve according to the present invention at different load conditions and at different ambient temperatures.

FIG. 2 is a diagrammatic representation of the control action of the thermostatic valve at very low ambient temperatures (curve consisting of a drawn-out line) and at higher outside temperatures (dotted curve) during various operating conditions. The diagram shows the temperature (T) in the engine forward flow over the time (t) at various load conditions. When an internal-combustion engine, whose cooling system is equipped with the thermostatic valve according to the invention, is started at low outside temperatures, the temperature in the short-circuit flow will rise (from the engine return flow 32 to the engine forward flow 33). In the process, the housing 13 of the thermostatic working element 12 will be heated. However, this housing 13 is subjected not only to this relatively fast heating-up short-circuit flow of the coolant but also to the continuously cold coolant of the radiator return flow 31. As a result, a mixing temperature is formed for the housing 13 and the expansion material contained in it. It is only when this mixing temperature reaches the predetermined opening temperature, that the working piston 17 starts to move out. This opening temperature is therefore reached at a higher temperature in the engine forward flow 32 than when higher outside temperatures exist, and thus the coolant in the radiator return flow 31 has less influence on the mixing temperature occurring in the housing and in the expansion material. If, after the opening, the internal-combustion engine continues to be operated at partial load, the temperature of the coolant in the radiator return flow remains relatively low so that the cooling effect of the thermostatic working element 12 caused by it continues to exist and sets the thermostatic valve to a higher operating temperature level. This operating temperature level is largely maintained to be constant as long as the operating condition (partial load) exists. If the internal-combustion engine is then operated in a next driving position at full load, the cooling demand for the internal-combustion engine will be increased. Also in the case of relatively low outside temperatures, the coolant in the radiator will reach a clearly higher temperature so that the coolant of the radiator return flow 31 has less influence on the housing 13 of the thermostatic working element and therefore on the expansion material. It will then be set to a lower temperature level in the engine forward flow 33.

The differences between the dotted curve of the temperature course at a relatively high ambient temperature (summer operation) and the curve indicated by drawn-out lines (winter operation) of the temperature curve illustrated in FIG. 2 are the larger, the lower the ambient temperature and thus the temperature of the coolant in the radiator return flow 31.

Furthermore, the above-described effect is a function of the cooling output. The higher the cooling output of the radiator, the larger the differences between the two curves illustrated in FIG. 2.

The influence of the coolant temperature in the radiator return flow 31 is also a function of the extent to which the temperature sensing element is subjected to this coolant flow. This can be affected by the size of the free surface of the housing 13 of the thermostatic working element which is situated in the coolant flow of the radiator return flow 31. This, in turn, is a function of the size of the housing 13 and of the type of the holder 14. For example, in certain embodiments the housing is held only in the area of its closed end by a modified holder. The collar 20 of the main valve disk 18 is then constructed such that it is slidingly guided on the housing 13. In this embodiment, a sealing ring will then be provided in the collar. In another modified embodiment, the collar (on top in the drawing) projects beyond the valve disk 18 and therefore determines which surface of the housing 13 of the working element 12 is subjected to the coolant flow of the radiator return flow 31 which will then increase with the movement of the main valve disk 18 at higher temperatures in the radiator return flow 31.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A thermostatic valve for a cooling system of an internal combustion engine comprising:
    a thermostatic working element which has a housing containing a working piston and an expansion material which drives the working piston out of the housing as a function of the temperature and therefore, as a function of the temperature of a coolant, the housing being held in a stationary manner in the thermostatic valve;
    a main valve having a main valve disk and a short-circuit valve having a short-circuit valve disk, the main valve disk and the short-circuit valve disk bounding a mixing chamber for coolant which flows in from a radiator through the main valve and for coolant which flows in directly from the internal-combustion engine through the short-circuit valve and is then returned to the internal-combustion engine, the thermostatic working element operatively coupled to the main valve disk and the short-circuit valve disk to set the positions of the main valve disk and of the short-circuit valve disk;
    wherein the working piston is connected with the short-circuit disk and the main valve disk, the main valve disk substantially surrounding the housing of the working element in a pot-type manner and having side walls with openings, the main valve disk being guided at least in the area of its closing position in a sealing manner on the housing of the working element, and wherein on a side of the main valve disk which faces away from the working piston, the housing of the working element is at least partially exposed to coolant flowing in from the radiator.

2. A thermostatic valve according to claim 1, wherein the main valve disk has a closed collar that guides the main valve disk on the housing of the working element.

3. A thermostatic valve according to claim 2, further comprising a bottom supported on the working piston of the working element, said bottom being connected with the collar of the main valve disk.

4. A thermostatic valve according to claim 3, further comprising a pin that projects away from the bottom of the main valve disk as an extension of the working piston, said pin carrying the short-circuit valve disk.

5. A thermostatic valve for a cooling system of an internal combustion engine comprising:
    a thermostatic working element which has a housing containing a working piston and an expansion material which drives the working piston out of the housing as a function of the temperature and therefore, as a function of the temperature of a coolant, the housing being held in a stationary manner in the thermostatic valve;
    a main valve having a main valve disk and a short-circuit valve having a short-circuit valve disk, the main valve disk and the short-circuit valve disk bounding a mixing chamber for coolant which flows in from a radiator through the main valve and for coolant which flows in directly from the internal-combustion engine through the short-circuit valve and is then returned to the internal-combustion engine, the thermostatic working element operatively coupled to the main valve disk and the short-circuit valve disk to set the positions of the main valve disk and of the short-circuit valve disk;
    wherein the working piston is connected with the short-circuit disk and the main valve disk, the main valve disk substantially surrounding the housing of the working element in a pot-type manner and having side walls with openings, the main valve disk being guided at least in the area of its closing position in a sealing manner on a holder of the housing of the working element, and wherein on a side of the main valve disk which faces away from the working piston, the housing of the working element is at least partially exposed to coolant flowing in from the radiator.

6. A thermostatic valve according to claim 5, wherein the main valve disk has a closed collar that guides the main valve disk on the holder accommodating the housing of the working element.

7. A thermostatic valve according to claim 6, further comprising a bottom supported on the working piston of the working element, said bottom being connected with the collar of the main valve disk.

8. A thermostatic valve according to claim 7, further comprising a pin that projects away from the bottom of the main valve disk as an extension of the working piston, said pin carrying the short-circuit valve disk.

* * * * *